United States Patent

[11] 3,634,097

| [72] | Inventors | Ahmed F. Mabrouk;<br>Jerry K. Jarboe, both of Framingham, Mass. |
|---|---|---|
| [21] | Appl. No. | 884,334 |
| [22] | Filed | Dec. 11, 1969 |
| [45] | Patented | Jan. 11, 1972 |
| [73] | Assignee | The United States of America as represented by the Secretary of the Army |

[54] METHOD OF EXTRACTING AND CONCENTRATING FLAVOR PRECURSORS OF MEATS
6 Claims, No Drawings

[52] U.S. Cl. .................................................... 99/110, 99/107, 99/108, 99/140
[51] Int. Cl. ........................................................A22c 18/00, A23l 1/44
[50] Field of Search............................................. 99/107, 108, 110, 140, 208, 209

[56] References Cited
UNITED STATES PATENTS

| 3,047,399 | 7/1962 | Landmann et al. | 99/110 |
| 3,538,973 | 11/1970 | Levin | 99/208 X |

*Primary Examiner*—Hyman Lord
*Attorneys*—Harry M. Saragovitz, Edward J. Kelly, Herbert Berl and Charles F. Murphy

ABSTRACT: Method of producing a flavor concentrate of a meat, particularly beef, comprising the step of removing substantially all fat from comminuted meat prior to extraction of water-soluble constituents of the meat, dialysis of the aqueous solutions, and gel permeation chromatographic fractionation and concentration of the flavor producing constituents of the diffusates from the dialyses.

METHOD OF EXTRACTING AND CONCENTRATING FLAVOR PRECURSORS OF MEATS

The invention described herein may be manufactured, used, and licensed by or for the Government for governmental purposes without the payment to us of any royalty thereon.

This invention relates to a method of extracting and concentrating the flavor precursors of meats. More particularly the invention relates to an improved method of extracting the flavor precursors of beef and fractionating the extract obtained thereby to obtain a substantially higher yield of the flavor-producing components of beef muscle than has heretofore been possible.

Beef muscle contains water-soluble flavor precursors which, upon cooking of the meat, produce the greatly desired flavor of cooked beefsteak, roast beef or ground beef, such as hamburgers. However, these flavor precursors are subject to changes which make precooked and reheated beef products or canned beef products much less desirable from a flavor standpoint than freshly cooked beef products which have not been exposed to excessively high temperatures for long periods of time, such as occurs in the sterilization of canned beef products.

For a long time, there has been a need for a method of obtaining the essential flavor precursors of beef in concentrated form so that they may be used to enhance the desirability of the flavor of beef products which are poor in beef flavor, such as some of the less expensive cuts of beef, or to overcome some of the relatively less desirable flavors which naturally develop in beef which has been sterilized in cans and held for varying periods of time before being consumed, or in precooked beef which is refrigerated for substantial periods of time before being eaten, either reheated or cold. The acceptability of such beef products could be greatly increased if such a concentrate of beef flavor precursors were available in a stable state for application to the beef products immediately prior to consumption thereof.

Efforts have been made heretofore to isolate the precursors of beef flavor. However, until the present invention, the yields of beef flavor precursors have been extremely low.

It is, therefore, an object of the present invention to provide a method for extracting the flavor precursors of beef in improved yields.

A further object of the invention is to provide a method of concentrating the flavor precursors of beef which have been extracted from beef muscle in improved yields to obtain highly concentrated beef flavor precursors substantially free of extraneous materials which contribute little or nothing to the desirable beef flavor developing properties of the beef flavor precursors.

Other objects and advantages will appear from the following description of the invention, and the novel features will be particularly pointed out in connection with the appended claims.

The method of extracting the beef flavor precursors from beef muscle in accordance with the present invention comprises lyophilization of comminuted beef muscle, extraction of the lyophilized comminuted beef muscle with a solvent for fats, such as petroleum ether, to remove fat components, extraction of the fat-free beef with water, dialysis of the aqueous extract using water as the dialyzing medium, and lyophilization of the diffusate material to powder form. It is important that the meat, the flavor precursors, and aqueous solutions thereof be maintained at temperatures below about 7° C. at all times during processing in order to minimize degradation of the flavor precursors. It is, of course, impractical to filter or dialyze the aqueous solutions if the temperature is so low as to cause freezing or separation of ice crystals from the solutions during processing steps which do not involve lyophilization of aqueous solutions or storage of the lyophilized flavor precursor materials. Therefore, during steps in the process other than lyophilization and storage of the lyophilized materials it is preferred to maintain the meat and aqueous solutions comprising flavor precursor materials at from about 1° C. to about 7° C., which is readily accomplished in most cold storage rooms or boxes.

Further concentration of the diffusate beef flavor precursor material is accomplished by subjecting the aqueous diffusate solution, or an aqueous solution prepared from the lyophilized diffusate material, to gel filtration or gel permeation chromatography employing a stacked column of esterified dextran gel, such as those manufactured by Pharmacia of Uppsala, Sweden under the trade name "Sephadex." Three different types of Sephadex gel are incorporated in layers in the stacked column so that molecular weights of the flavor precursor ingredients up to about 700 are retarded by the top layer of Sephadex gel, molecular weights up to about 1,500 are retarded by the second layer of the Sephadex gel, and molecular weights up to about 5,000 are retarded by the third layer of Sephadex gel. Elution of this stacked column containing a sample of beef extract diffusates results in the separation of the diffusate flavor precursor material into 12 distinct fractions, two of which contain substantially all of the beef flavor-producing ingredients from the diffusate beef flavor precursor material. These two fractions may be combined, or maintained separate one from the other as desired. Since the Sephadex gel has a protective effect against degradation of the molecules of the flavor precursors, the fractionation by means of the stacked column of gel may be carried out at temperatures above 7° C. and as high as room temperature, provided that the fractions are quickly cooled to below 7° C. after collection thereof. It is preferred, however, to carry out the fractionation of the solutions of diffusate material at temperatures below 7° C. as in the other steps in the process. The two fractions containing most of the flavor precursor material are lyophilized in order to protect them from too rapid changes due to degradation. They may be afforded additional protection against changes by storing them under vacuum in the lyophilized form in a desiccator above phosphorus pentoxide at low temperatures, such as −20° C. or lower. Similar treatment may be accorded the lyophilized diffusate beef flavor precursor material, or the lyophilized solutes of the aqueous extracts from which the diffusates are prepared, to preserve them relatively free of change until they are to be used as such or further concentrated by gel permeation chromatography or other procedure.

The important distinction between the use of the stacked column in the gel permeation chromatography procedure of the invention and the prior art procedure of using a column containing a single type of Sephadex gel or a series of three different columns, each containing a different type of Sephadex gel, is that the fractionation is accomplished more efficiently and with much less mixing of the fractions when the stacked column is used in accordance with the present invention.

Having described the general conditions under which the invention may be practiced, we will now disclose an example of the production of a diffusate beef flavor precursor material and of a concentrate prepared therefrom by gel permeation chromatography in accordance with the present invention. It will be understood, of course, that the above-enumerated and other objects of our invention may also be accomplished by varying the solvent used in removing the fat from the lyophilized comminuted beef, the dialysis membranes used in dialyzing the aqueous extracts of the fat-free beef, and the gels used in the gel permeation chromatography for fractionating the diffusate beef flavor precursor material, and by other suitable variations of the detailed method steps, about to be set forth below, which are intended to be for illustrative purposes and not for the purpose of limiting the scope of our invention.

EXAMPLE

Semimembranosus muscle was dissected from a U.S. Good grade round of beef and trimmed free of obvious fat and connective tissue, then ground twice in an electric grinder at 5° C. to give 3,630 grams of ground beef muscle. The ground muscle was blended with an equal weight of deionized water at about 5° C. for 2 minutes. The resulting slurry was shell frozen and lyophilized. The lyophilized ground muscle was extracted with petroleum ether (boiling point 30° to 60° C.) in a Soxhlet apparatus for 24 hours to remove substantially all fat from the ground muscle. The residue of substantially fat-free ground muscle was blended for 4 minutes at about 5° C. with tenfold its weight of deionized water containing 0.1 percent chloroform to inhibit bacterial growth and the action of tissue phospholipases. The slurry was stirred continuously for 3 hours while being held at 5° C. The mixture was then centrifuged for 20 minutes at 5,120×G at about 5° C. The supernatant liquid was then filtered through Whatman filter paper No. 41 and the filtrate was designated "first filtrate." The residue, comprising all of the precipitated solids from the above slurry, was blended with 4 liters of deionized water and stirred continuously for 3 hours while being held at about 5° C. The mixture was then centrifuged for 20 minutes at 5,120×G at about 5° C. The supernatant liquid was then filtered through Whatman filter No. 41 and the filtrate was designated "second filtrate."

Dialysis of the first filtrate was carried out in an Oxford rotating multiple dialyzer capable of handling 16 samples simultaneously. The dialysis bags were prepared from seamless cellulose dialysis tubing (Viscose process, size 27, 1.312-inch flat width, 0.0010-inch wall thickness, and average pore radius of 24 A.) manufactured by Union Carbide Corporation. The dialysis bags were thoroughly washed with deionized water prior to use in dialysis to remove glycerol and sulfur compounds therefrom. Each dialysis bag was filled with 250 ml. of deionized water and 16 of these bags were rotated for about 18 hours in about 14 liters of the first filtrate at about 5° C. Two batches of 16 dialysis bags of deionized water were rotated as above in the first filtrate and the contents of the 32 dialysis bags were combined and designated "diffusate I." The nondiffusible fraction remaining in the approximately 14 liters of the first filtrate was lyophilized; the second filtrate was also lyophilized; and these two lyophilized fractions were combined and dissolved in 12 liters of deionized water. Dialysis of the solution was carried out in the same manner as above-described for dialysis of the first filtrate. The contents of the first 16 bags of diffusate were designated "diffusate II" and the contents of the second 16 bags of diffusate were designated "diffusate III." The 8 liters of diffusate I and the 4 liters each of diffusate II and diffusate III, when lyophilized, produced quantities of grayish white powders representing approximately 0.55 percent of the original beef muscle as lyophilized diffusate I, approximately 0.49 percent of the original beef muscle as lyophilized diffusate II, and approximately 0.38 percent of the original beef muscle as lyophilized diffusate III, the sum of these three lyophilized diffusates representing approximately 1.42 percent by weight of the original beef muscle. The mixture of the three diffusates comprised substantially all of the flavor precursors of the beef muscle.

A similar quantity of semimembranosus muscle from U.S. Good grade round beef was subjected to the above-described extraction and dialyzing procedure with the exception that the lyophilized ground muscle was not made fat-free by extraction with petroleum ether prior to blending the ground beef muscle with deionized water and centrifuging and filtering the blend. The total of the three diffusates in this case represented only 0.42 percent of the original weight of ground beef muscle, thus showing that the removal of the fat from the ground beef muscle as described above assisted greatly in the extraction, centrifuging, filtration and dialysis of the diffusible flavor precursor components of the beef muscle so that more than three times as much lyophilized diffusate flavor precursor material was obtained when the fat was removed by extraction with petroleum ether than when the fat was left in the ground muscle during the subsequent extractions with water, centrifugation, filtration, and dialysis of the resulting solutions.

Diffusates I, II, and III prepared from the ground beef muscle which had been extracted with petroleum ether to remove fat were stored in vacuo in a desiccator above phosphorus pentoxide at about −20° C. until gel permeation chromatography could be carried out.

For the purpose of further concentrating the beef flavor precursors by gel permeation chromatography, a stacked column of methylated Sephadex gel was prepared comprising three layers of Sephadex gel of different types designed to retard molecules of different molecular weight ranges. The uppermost layer consisted of methylated Sephadex G-10, which retarded molecules of up to molecular weights of about 700. The middle layer of the column consisted of methylated Sephadex G-15, which retarded molecules of up to molecular weights of about 1,500. The bottom layer of the column consisted of methylated Sephadex G-25, which retarded molecules of up to molecular weights of about 5,000. The dry Sephadex types used were methylated with diazomethane prior to preparation of the gel permeation column in order to eliminate the free carboxyl groups present which contribute a very weak ion exchange activity to the gel. The stacked column used had dimensions of 2.5×100 cm., each Sephadex gel occupying approximately one-third of the column.

In carrying out the gel permeation chromatography an aqueous solution was prepared comprising either diffusate I, or diffusate II, or diffusate III, the solution containing a total of about 2 grams of the diffusate based on its dry weight so that the aqueous solution contained about 12 mg. of diffusate per gram of dry Sephadex in the stacked column. This aqueous solution of the diffusate was introduced at the top of the column and permitted to percolate downwardly through the stacked column. When the level of the last part of the aqueous solution was at the top of the gel and the topmost portion of the gel was still wet with the solution, the stopcock in the bottom of the tube containing the stacked column was closed and the top of the column was connected to a Mariotte flask containing deionized water. Elution was started by opening the stopcock of the stacked column, the deionized water passing from the Mariotte flask into the stacked column and downwardly therethrough. The eluate was monitored by being passed through a double beam ultraviolet monitor, Uviscan Model II (manufactured by Buchler Instruments, Inc., Fort Lee, N.J.), equipped with a V. O. M.-6 Bausch & Lomb recorder and was separated into 12 distinct fractions based on the ultraviolet absorption characteristics of these fractions as determined with the Uviscan Model II and the V. O. M.-6 recorder. Fractions 5 and 6, which exhibited maximum absorption at 250 m$\mu$ and 248 m$\mu$ respectively, comprised much the strongest beef aroma producing components and constituted approximately 0.40 percent and approximately 0.71 percent by weight respectively of the original fresh ground beef muscle, the two fractions totaling approximately 1.11 percent by weight of the original fresh ground beef muscle. Five more fractions had appreciably lower beef aroma-producing characteristics, but were present in such small proportions of the original weight of the fresh ground beef muscle and exhibited so much less beef aroma-producing characteristics than fractions 5 and 6 that they were considered not to play a significant part in imparting beef flavor and aroma to beef muscle.

In a second run of the extraction of ground beef muscle similar to that described above, the first filtrate was combined with the second filtrate and this mixture was lyophilized to obtain a grayish powder which represented about 6.5 percent by weight of the original ground beef muscle and which contained substantially all of the beef flavor precursor ingredients. This powder contained a sufficiently high concentration of the beef flavor and aroma precursor materials to be employed in fortifying the beef flavor of gravies, stews, and the like where the most concentrated form of the beef flavor precursors is not required.

Although the invention has been described with respect to the extraction of the flavor-producing precursors of the Semimembranosus muscle of beef round, the method may also be applied to other muscles of beef, such as the Semitendinosus muscle and the Gracilis muscle of beef round, or other parts of beef. The method may also be applied to the extraction and concentration of the flavor precursors of chicken, pork, veal, lamb and other meat or fish or other animal product which is considered edible. When applied to the Semitendinosus muscle of beef round, the total of diffusate I, diffusate II, and diffusate III amounted to approximately 1.42 percent by weight of the original ground beef muscle, substantially the same as with the Semimembranosus muscle of beef round. However, when applied to the Gracilis muscle of beef round, the method produced a total of the three diffusates of only 0.61 percent by weight of the original ground Gracilis muscle. By way of contrast, when Semitendinosus muscle of beef round was extracted and dialyzed by the prior art method without extracting the fat therefrom prior to the dialyses, only 0.42 percent by weight of the original ground beef muscle was obtained as the sum of the three diffusates; and when Gracilis muscle of beef round was extracted and dialyzed without extracting the fat therefrom prior to the dialyses, only 0.18 percent by weight of the original ground beef muscle was obtained as the sum of the three diffusates. It is, therefore, apparent in these cases as well as with the Semimembranosus muscle of beef round that fat interferes with the extraction and concentration of the beef flavor precursors and that the step of extracting the fat from the lyophilized ground beef muscle prior to centrifugation, filtration and dialysis makes possible a much higher recovery of the beef flavor precursors from beef muscle.

The concentrates obtained in accordance with the above example are quite useful for improving or fortifying the flavor of beef products, especially precooked beef which has been held under refrigeration for a substantial period of time or which has been preserved by canning. For example, roast beef has been refrigerated for 2 days, then sprayed with 10 ml. of an aqueous solution containing about 1 g. of beef diffusate for 105 g. of roast beef in two slices, the beef diffusate being diffusate I prepared from Semimembranosus muscle of beef round prepared in accordance with the method of the present invention. The slices of treated roast beef were heated in a microwave oven for 2 minutes and then compared by an expert food tasting panel with a similar quantity of the roast beef which had not been treated with the beef diffusate but has been heated in the microwave oven for 2 minutes prior to the taste comparison test. Six of the eight panelists preferred the treated roast beef because of its resemblance to the flavor and aroma of freshly roasted beef. It is, therefore, apparent that the diffusates and concentrates prepared in accordance with the method of the present invention are effective and useful in restoring to precooked and preserved or refrigerated meat a flavor closely approximating that of freshly cooked meat of the same kind. This constitutes a great advantage since meat that is held for substantial periods of time after being cooked quite often develops stale flavors which make it much less palatable than freshly cooked meat. The improved yield of the flavor precursors of meat obtained in accordance with the present invention provides a substantial advantage over methods of extracting and concentrating meat flavor precursors in accordance with the prior art.

It will be understood, of course, that the foregoing example of the practice of our invention is for illustrative purposes and that the detailed instructions as to the proportioning of the materials employed as well as the sequence of steps in the process may be varied within the skill of the expert in the art of food technology. These and other variations which will readily occur to the expert are thus included within the spirit and scope of our invention.

We claim:

1. Method of producing a flavor concentrate of a meat which comprises the steps of:
   a. trimming said meat to remove substantially all of the obvious fat and connective tissue therefrom;
   b. comminuting said meat;
   c. lyophilizing said comminuted meat;
   d. removing substantially all of the fat remaining after said trimming from said lyophilized comminuted meat by extracting said fat with a solvent therefor;
   e. blending said substantially fat-free lyophilized comminuted meat with deionized water to form an aqueous solution of the water-soluble materials of said comminuted meat; and
   f. separating said aqueous solution from the water-insoluble portions of said comminuted meat by filtration to produce a filtrate and a residue, subjecting said filtrate to dialysis through a cellulose membrane employing deionized water as the dialyzing medium to produce a diffusate, and lyophilizing said diffusate to produce the flavor concentrate, all of said steps being performed in a temperature range between about 1° C. and about 7° C.

2. Method of producing a flavor concentrate of a meat according to claim 1, wherein said residue is blended with deionized water to form a second aqueous solution of water-soluble materials remaining in the residue from the initial filtration and thereafter said second aqueous solution is separated from the water-insoluble portions of the residue from the initial filtration by filtration to produce a second filtrate and a second residue, and lyophilizing said second filtrate to produce a flavor concentrate,
   said second aqueous solution and said second filtrate being maintained below about 7° C. at all times during processing.

3. Method of producing a flavor concentrate of a meat according to claim 2, wherein the filtrate of the initial filtration is subjected to dialysis through a cellulose membrane employing deionized water as the dialyzing medium to produce a first diffusate and leaving a nondiffusible fraction outside of said cellulose membrane, lyophilizing said nondiffusible fraction and said second filtrate and forming an aqueous solution of said lyophilized nondiffusible fraction and said lyophilized second filtrate in deionized water, dialyzing said aqueous solution of said lyophilized nondiffusible fraction and said lyophilized second filtrate through a cellulose membrane employing deionized water as the dialyzing medium to produce a second diffusate, dialyzing said aqueous solution of said lyophilized nondiffusible fraction and said lyophilized second filtrate once more through a cellulose membrane employing deionized water as the dialyzing medium to produce a third diffusate, and lyophilizing said first diffusate, said second diffusate, and said third diffusate to produce said flavor concentrate,
   said dialyzing medium, said first diffusate, said nondiffusible fraction, said second diffusate, and said third diffusate being maintained between about 1° C. and about 7° C. at all times during processing.

4. Method of producing a flavor concentrate of a meat according to claim 1, wherein said lyophilized diffusate is dissolved in deionized water to form an aqueous solution of said diffusate, said aqueous solution of said diffusate is subjected to gel permeation chromatography to produce 12 fractions according to ultraviolet light absorbancy characteristics of each of said 12 fractions, and fractions 5 and 6 of said 12 fractions having absorption maxima at 250 m$\mu$ and 248 m$\mu$, respectively in the ultraviolet absorption spectrum are lyophillzed to produce said flavor concentrate.

5. Method of producing a flavor concentrate of a meat according to claim 3 wherein said lyophilized first diffusate, said lyophilized second diffusate, and said lyophilized third diffusate are dissolved in deionized water to form an aqueous solution of said first diffusate, said second diffusate, and said third diffusate, said aqueous solution is subjected to gel permeation chromatography to produce 12 fractions according to ultraviolet light absorbancy characteristics of each of said 12 fractions, and fractions 5 and 6 of said 12 fractions having absorption maxima at 250 m$\mu$ and 248 m$\mu$, respectively, in the ultraviolet absorption spectrum are lyophilized to produce said flavor concentrate.

6. Method according to claim 1, wherein said meat is beef.

* * * * *